United States Patent

[11] 3,629,935

[72] Inventor  John W. Carino
               Columbia, S.C.
[21] Appl. No. 12,528
[22] Filed     Jan. 29, 1970
[45] Patented  Dec. 28, 1971
[73] Assignee  General Electric Company
               Original application May 22, 1968, Ser.
               No. 731,229, now Patent No. 3,569,794.
               Divided and this application Jan. 29, 1970,
               Ser. No. 12,528

[54] METHOD OF MAKING CAPACITOR HAVING CHORDWISE TAB-RETAINING SLIT
     5 Claims, 3 Drawing Figs.
[52] U.S. Cl. ................................................. 29/570,
                                                             29/589
[51] Int. Cl. ............................................... H01g 9/00
[50] Field of Search .......................................... 29/570,
                                                    25.41, 589; 317/230

[56]           References Cited
           UNITED STATES PATENTS
2,676,287   4/1954   Brennan ......................... 317/230
2,758,149   8/1956   Brennan ......................... 317/230 X
3,428,869   2/1969   Gilbert .......................... 317/230

Primary Examiner—John F. Campbell
Assistant Examiner—Carl E. Hall
Attorneys—Nathan J. Cornfeld, Frank L. Neuhauser, Oscar B. Waddell, John P. Taylor and Joseph B. Forman ABSTRACT: An improved electrolytic capacitor cover is disclosed which includes inner and outer relatively rigid supporting disc members and an intermediate disc member of a rubbery or easily sealable material. The supporting disc members contain a number of slots therein for the passage of capacitor leads therethrough, and these slots are in registry with slits in the rubbery sealing material. The inner disc member includes a chordwise slot therein in registry with a chordwise slit in the rubbery seal material. In the assembly of the capacitor a soft cathode foil tab or riser is easily passed through the chordwise slit by a slicing action therein.

PATENTED DEC28 1971 3,629,935

INVENTOR.
JOHN W. CARINO
BY
ATTORNEY

METHOD OF MAKING CAPACITOR HAVING CHORDWISE TAB-RETAINING SLIT

The inner disc member includes a chordwise slot therein in registry with a chordwise slit in the rubbery seal material. In the assembly of the capacitor a soft cathode foil tab or riser is easily passed through the chordwise slit by a slicing action therein.

This application is a division of applicant's copending application Ser. No. 731,229 filed May 22, 1968, U.S. Pat. No. 3,569,794 and assigned to the same assignee as the present invention.

This invention relates to an improved capacitor cover, and more particularly to means for passing a relatively soft foil tab or riser through a self-sealing material by means of a chordwise slit in the material.

In electrolytic capacitors, particularly, there are a number of important problems relating to proper sealing of the capacitor leads which pass from the capacitor casing through an appropriate cover therein for connection to external apparatus circuitry. Sealing problems are severe for a number of reasons including those related to the variable extremes of operating temperatures, as well as exposure of the cover to the electrochemical action of the electrolyte in the capacitor. All of the leads which pass through the capacitor cover must include an appropriate seal between the lead and the cover to prevent electrolyte leakage and other deleterious results. One of these leads includes a cathode tab which attaches to a cathode foil in the usual capacitor roll section. This cathode tab is ordinarily a very thin soft foillike material comprising, for example, a 0.010 inch thickness aluminum strip. The cathode tab either passes through the cover or around a cover, i.e., between the cover and the engaging capacitor casing, to engage a mounting ring or grounding lug external to the capacitor. Because of the fragile nature of this cathode tab it is difficult to insert the tab through proper openings in the cover to connect to an external mounting ring, or, in passing the cathode tab through or around the cover, subsequent can forming and seal crimping means provides a number of pinch and stretch problems to this fragile cathode tab.

Accordingly, it is an object of this invention to provide an improved cathode tab sealing means in a capacitor cover.

It is a further objection of this invention to provide improved means of passing a fragile cathode tab through a sealing material in a capacitor can cover.

It is a further object of this invention to provide a noncured elastomer portion of a capacitor cover which contains a chordwise slit therein for a sidewise and slicing positioning action of a fragile cathode tab therein.

It is another object of this invention to provide a cathode tab configuration which passes through chordwise entry means in a part of a cover assembly before passing between the cover assembly and the capacitor casing.

This invention will be better understood when taken in connection with the following description and the drawings in which.

Briefly described, this invention relates in one form to an electrolytic capacitor casing cover which comprises an inner and outer relatively rigid supporting disc member and an intermediate quantity or disc of a self-sealing or heat scalable material. In order to pass a thin fragile cathode tab through a part of this cover assembly, the inner disc member is provided with a slot, and the intermediate scaling material is formed with a chordwise slit therein in registry with the noted slot. Consequently, the thin fragile cathode tab is not required to puncture its way through the sealing material but may be positioned therein by a slicing action through the provided slit.

Figure 1:
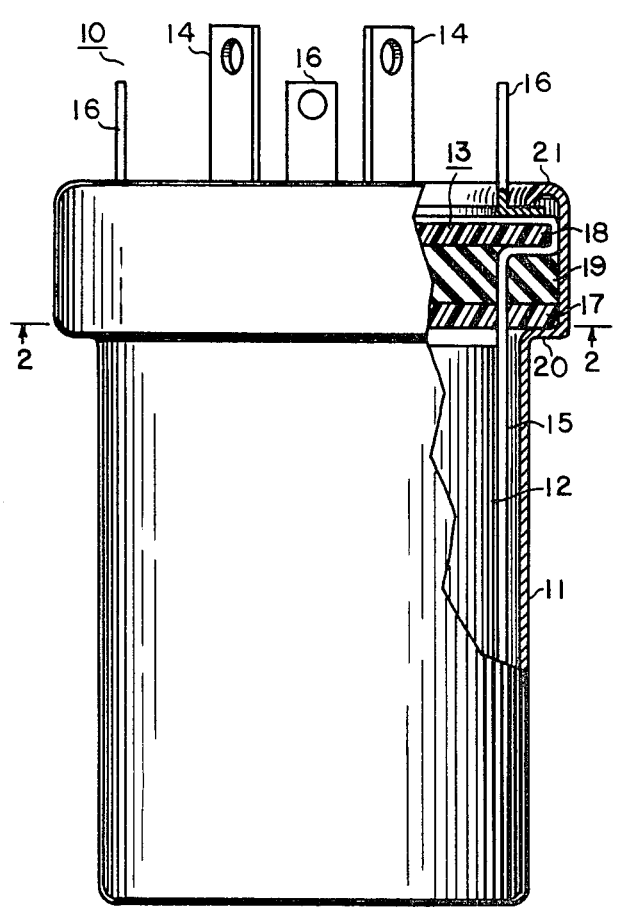
FIG. 1 is a partial cross-sectional view of a capacitor assembly in accordance with this invention.

Referring now to FIG. 1, there is illustrated a capacitor 10 having a casing 11 with a capacitor roll section 12 therein. Capacitor 10 also includes a cover assembly 13 through which pass, for example, four capacitor leads 14, two of which are not shown. A cathode tab 15 extends from roll section 12 through a part of cover assembly 13 to make contact with an external mounting ring or grounding lug 16.

Cover assembly 13 comprises a pair of electrically insulating disc members 17 and 18 described as inner and outer, or top and bottom, rigid supporting members. Rigid disc members 17 and 18 include therebetween, in generally concentric relationship, a further disclike member or layer 19 of a sealing material such as an electrically insulating heat sealable material or uncured elastomer. As illustrated in FIG. 1, cover assembly 13 rests upon a shoulder section 20 of casing 10 while a lip portion 21 is formed about the periphery of the cover. During the formation of the lip portion 21, the cover assembly 13 is compressed between the lip and the shoulder 20 so that the material of member 19, which is preferably tacky, is compressed and forced outwardly to engage and seal with the casing 11. At the same time member 19 is compressed in constricting relationship about the leads 14 passing therethrough to provide a seal between the leads and the cover 12.

In many instances it is desirable to employ a cathode tab lead 15 in the form of a thin ribbon of aluminum. This form of cathode is particularly advantageous in that the cathode tab is inserted during the winding of the capacitor roll section 12, and it is usually uncertain where the exact final location of the cathode tab 15 will be with respect to the anode leads 14 for proper assembly through prepunched slots. Consequently a very thin cathode tab is desirable in that it may be moved about, within limitations, at the periphery of the roll 12 to have the desired alignment with leads 14. For example, cathode tab 15 may comprise a very thin strip of aluminum foil of about 0.010 inch thickness. Tab 15 is usually placed within the roll section 12 in contact with the cathode foil therein, near the outer edge of the roll and extends from the roll bottom. Tab 15 is then folded at the bottom of the roll section 12 around the edge thereof to lie along side the roll and extend upwardly, as illustrated in FIG. 1, through cover 13. As previously indicated, cover 13 is required to seal an electrolyte within the casing 11, and at the same time, to facilitate the passage of capacitor leads therethrough. With respect to the leads 14, their structure is such that they include a relative amount of stiffness, first because they are of aluminum of about 0.020 inch thickness, and secondly, because they are coated with an aluminum oxide film which increases their structural rigidity. Accordingly, these leads 14 may be projected quite easily through cover 13 through predetermined openings in the inner and outer stiff disc members, and appropriate slits in the intermediate sealing material.

Figure 2:
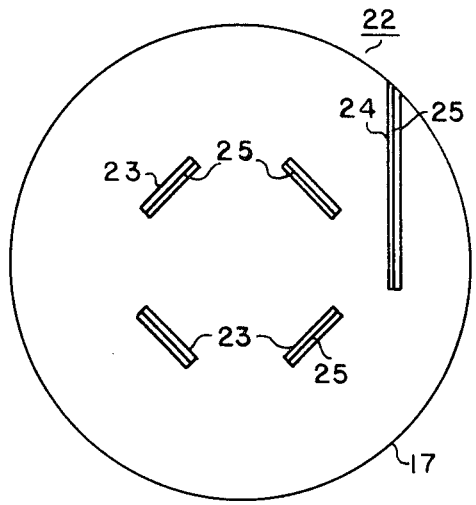
FIG. 2 is a bottom view of the cover assembly of FIG. 1 taken along line 2—2 of FIG. 1.

More particularly, cover 13 is better described with respect to FIG. 2. Referring now to FIG. 2, there is shown the inner one of the relatively stiff nonconducting disc members 17 as viewed along the lines 2—2 of FIG. 1. Member 17 in a preferred form of this invention is of a nonconducting material, for example, a synthetic resin material or a phenolic material. This member 17 includes four equally spaced and geometrically positioned slot openings 23 which are easily adaptable for registry with anode leads 14. Member 17 also includes a chordwise slot 24 of about 0.040 inch width and extending inwardly of the periphery of disc 17 to a distance slightly beyond the centerline. Directly behind the disc 17 of FIG. 2, there is positioned the sealing material member 19. Member 19 includes slit portions 25 therein which are in registry with the slots 23 and chord slot 24. These slit portions represent a cutting through of the sealing material and are preferably coextensive with the slot openings in member 17. Preferably, as opposed to a slot, the slits 25 describe a cutting or slicing where little, if any, material is removed.

Figure 3:
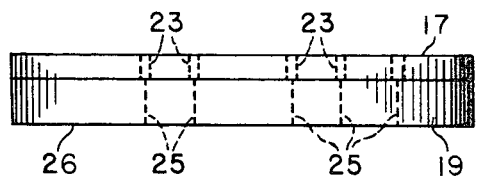
FIG. 3 is an inverted side elevation view of the cover assembly of FIG. 2 without the upper disc member 18 of FIG. 1.

Referring to FIG. 3, there is illustrated a combined phenolic disc 17 and sealing material member 19. In practice, as one example, sealing material member 19 is usually bonded to disc member 17 and may therefore be in the form of a coating or layer thereon. For example, member 19 may comprise a black uncured gum rubber such as camelback bonded to a disc member 17 of a phenolic resin compound. Furthermore, as a matter of manufacturing practice, and to prevent the uncured rubber from sticking to corresponding uncured rubber on other cover members, when cover members are loosely packed for shipment, a thin film, for example, of polyethylene on the order of 0.005 inch thickness, may be utilized to cover the exposed face of member 19. One such film layer is indicated as part 26 of FIG. 3.

The sealing characteristics of the sealing material member 19 are such that it is preferred that the slitting operation not remove any significant quantity of the material thereof. This assures a very close fit between the leads 14 and the sealing material while at the same time not preventing the relatively easy insertion of the leads 14 through the sealing material. In the practice of this invention it has been found that the cathode tab 15 is easily inserted in its slit in the sealing material, particularly by a knifing or slicing action.

According to one practice of this invention, the capacitor roll section 12 is formed together with the addition thereto of the capacitor cathode tab 15. Thereafter the cover member of FIG. 2 is placed over the anode leads 14 until such time as the leads 14 project through the slots in disc member 17 and contact member 19. At that point, a longer cathode tab 15 is then partially inserted in its slit in member 19, and with a combined slicing and axial action the cover member is positioned adjacent the roll 12. After the roll is assembled to the cover member of FIG. 3, the capacitor roll section is placed within the casing and the outer disc member 18 and mounting ring member 16 are positioned in their places indicated. In this arrangement tab 15 projects substantially vertically upwardly through members 17 and 19. After passing through member 19, tab 15 is folded over to be parallel to members 18 and 19 and therebetween. Tab 15 then passes horizontally to the casing 11 where it is folded around the periphery or edge of member 18 to lie under the ring portion of a mounting ring 16. Usually the tab 15 is folded on itself under the mounting ring 16 and is welded, riveted or otherwise attached thereto to provide a good electrical connection. Thereafter the capacitor can 11 is subjected to a rolling or deforming action to provide the lip 21. During the rolling operation, disc members 17 and 18, are crimped or otherwise forced together in such a manner that the sealing material of member 19 is caused to partially expand outwardly to engage and seal with the casing, and at the same time, to constrict about the leads 14 including cathode tab 15 to provide an appropriate seal.

As a part of the assembly operation, member 19 may be exposed to elevated temperatures to the extent that the adjacent slit edges therein more readily seal to each other to provide a seal about leads 14 and tab 15. It has been found, for example, that after heat treatment, samples of the sealing material member 19 of uncured camelback rubber disclosed excellent bonding in the slit areas.

Positioning the cathode tab 15 the arrangement, as illustrated by this invention in FIG. 1, provides a number of advantages, particularly in that the cathode tab 15 does not need to be threaded through a soft resilient material which has good puncture resistant properties as compared to the strength of the tab material. Furthermore, this invention provides for the use of a very thin aluminum tab instead of a much thicker and more rigid tab which is not only more difficult to provide in the capacitor roll 12, but which is also less adaptable for alignment adjustability in passing through the cover. A still further problem associated with prior cathode tabs is their position adjacent the casing, between the casing and the cover assembly. This positioning provides a pinching problem at the shoulder 20, when the shoulder is formed, such pinching leading at times to separation of the tab. Additionally, the rim rolling operation sometimes stretches the tab between the shoulder and the bottom of the capacitor roll so that breaking may take place.

While this invention has been disclosed with respect to particular embodiments thereof, numerous modifications may be made by those skilled in the art without departing from its true spirit and scope. Therefore, it is intended that the appended claims cover all such modifications and variations which come within the true spirit and scope of the present invention.

I claim:

1. A method of assembling a capacitor having a capacitor roll section provided with anode leads and a foil cathode tab and having a capacitor cover assembly which includes rigid disc members of electrically nonconducting material provided with anode-receiving slots and one of said members having a chordwise slot extending from its edge at least partially across the member, and a layer of electrically insulating soft sealing material rejoinable to itself and disposed adjacent said rigid disc members, said method comprising the steps of:
   A. forming a chordwise slit in said layer of soft sealing material of a length coextensive with said slot in said disc member and anode-receiving slits in registry with the anode-receiving slots in said disc members;
   B. placing the capacitor roll section adjacent said one of the disc members having a chordwise slot with said anode leads entering said slots thereof;
   C. inserting the cathode tab through said chordwise slot in said disc member and said chordwise slit in said layer and said anode leads through said anode-receiving slits;
   D. assembling a second of said disc members to said anode leads and to said layer;
   E. placing the cover assembly and roll section in a can member with said slots in said layer in registry with said slots in said disc members; and
   F. rolling a lip means on said can member adjacent said cover assembly to reseal said layer to itself thereby closing said slits into sealing engagement with said leads, tab and can.

2. A method according to claim 1, said cathode tab inserting step including utilizing a slicing action to insert the tab in the chordwise slit in said layer at the edge thereof.

3. A method according to claim 1, said inserting step including placing a portion of the cathode tab arranged parallel to said disc member and compressed between the disc member and said layer.

4. A method according to claim 1, further including the step of welding the cathode tab to a mounting ring.

5. A method according to claim 1, said resealing step including heat sealing said layer of soft sealing material.

* * * * *